United States Patent [19]

Leon et al.

[11] 4,327,560

[45] May 4, 1982

[54] EARTH-EMBEDDED, TEMPERATURE-STABILIZED HEAT EXCHANGER

[76] Inventors: Harry I. Leon; Vivian L. Leon, both of 924 Bowen St., NW., Atlanta, Ga. 30318

[21] Appl. No.: 156,123

[22] Filed: Jun. 3, 1980

[51] Int. Cl.³ .................... F25D 23/12; F25B 13/00
[52] U.S. Cl. .................................. 62/260; 62/235.1; 62/324.1; 165/45
[58] Field of Search ............... 62/260, 324.1, 2, 235.1; 165/45

[56] References Cited

U.S. PATENT DOCUMENTS

| | | | |
|---|---|---|---|
| 2,581,744 | 1/1952 | Zimmerman | 62/260 X |
| 2,584,573 | 2/1952 | Gay | 62/260 X |
| 4,042,012 | 8/1977 | Perry et al. | 62/260 X |
| 4,142,576 | 3/1979 | Perry et al. | 165/45 |
| 4,257,239 | 3/1981 | Partin et al. | 165/45 |

*Primary Examiner*—Lloyd L. King
*Attorney, Agent, or Firm*—Vivian L. Leon; Harry I. Leon

[57] ABSTRACT

A combination earth heat exchanger and heat storage device for a heat pump system in which the earth is the heat source/sink. The device includes an elongated, hermetically-sealed enclosure containing a phase change material which is in thermal contact with both the primary heat transfer fluid and the surrounding soil. The heat transfer fluid, a mixture of water and of antifreeze, is circulated in a closed loop through pipes, sections of which are jacketted by at least one enclosure containing a phase change material. For heat addition to the fluid stream, a phase change material is used which has a transition temperature which is approximately 10° F. below the mean seasonal ground temperature in the winter and slightly below the minimun undisturbed soil temperature at the depth at which the earth heat exchanger and heat storage device is embedded. The release of the latent heat to the heat transfer fluid limits the minimum temperature of the stream, thereby maintaining inlet conditions at the heat pump more favorable to its efficient operation than would otherwise be practicable. Alternately, for heat removal from the heat transfer fluid for cooling purposes, a phase change material is used which has a transition temperature which is approximately 10° F. above the mean seasonal ground temperature in the summer and slightly above the maximum undisturbed soil temperature at the depth at which the device is embedded. The absorption of latent heat from the fluid stream limits its maximum temperature, thereby significantly improving the coefficient of performance of the heat pump system for air conditioning purposes.

7 Claims, 5 Drawing Figures

EARTH-EMBEDDED, TEMPERATURE-STABILIZED HEAT EXCHANGER

BACKGROUND OF THE INVENTION

1. Field of the Invention

This invention relates generally to earth-embedded heat exchangers and particularly to such heat exchangers in which an aqueous primary heat transfer fluid is in thermal contact with an encapsulated material with a high latent heat of transition which is capable of undergoing a phase change under the normal operating conditions for a water-to-air heat pump system.

2. Description of the Prior Art

With the increased use of heat pumps in the heating and cooling of buildings has come the recognition that the efficiency of an air-to-air heat pump is high only when the outside ambient temperature is moderate. At ambient temperature extremes, the coefficient of performance of a heat pump falls drastically. At an ambient temperature of 32° F., operation continues only at an energy loss because the evaporator must be defrosted. As a consequence, alternate heat sources which would remain essentially constant despite fluctuating ambient air temperatures have been sought.

Ground water, under favorable conditions, is one such source; and ground water-to-air heat pumps have been operated at a high coefficient of performance year-around. However, the water sources commonly used in the past have been either well-water or city water. Either source would be quickly exhausted if it were widely adopted as a heat source/sink. These drawbacks can be overcome with the use of a closed water loop in which the earth itself serves as a giant heat sink for air conditioning in the summer and as a heat source from which large amounts of heat warmer than the ambient air can be extracted in the winter. Unfortunately, attempts to utilize heat pump systems in which the heat exchange medium is circulated in a closed loop through the earth have never worked very well.

Problems with such closed loop systems arose because little of the available heat in the earth's crust can be abstracted with the heat exchangers of the prior art. These heat exchangers typically comprised long sections of copper coil. No enclosures surrounding these coils and containing phase change materials were provided. Due to the low thermal conductivity and heat capacity of the earth, the energy in the vicinity of such earth coils was rapidly dissipated when the instantaneous heating demand of a heat pump system was placed on one of them. As a consequence, the temperature of the heat transfer fluid continued to fall; and within a relatively short period of time, a second earth coil which had been idle for a lengthy time interval and which had had sufficient time to recover had to be substituted for the exhausted earth coil. Alternately, the heat pump system had to be shut down.

Such earth coils, in addition to being very expensive and costly to install because of the long sections required to effect adequate heat transfer between the earth and the heat transfer medium, also tended to separate from the surrounding earth upon freezing during winter operation and to overheat plant roots in lawns and gardens as a result of summer heat dissipation. Moreover, a substantially large open area in close proximity to the structure to be conditioned was required in which to embed the earth coils; at least one sq. ft. of open area was required for every sq. ft. of heated floor area.

A further deterrent to the widespread use of such closed loop systems was the need for custom-designed components due to the variation in soil properties from one locale to another. This obstacle has been compounded by the addition of thermal storage tanks, the most commonly employed means in the prior art for reducing the instantaneous heating or cooling demand of the heat pump system upon the earth coil.

SUMMARY OF THE INVENTION

An object of the present invention is to provide a system for transferring heat from the earth to a conditioned space wherein the heat transfer fluid is circulated in a substantially closed loop through an improved earth coil. Sections of the coil are jacketted with one or more hermetically-sealed enclosures which are adaped to be charged with a composition which upon crystallization releases latent heat. The transition temperature at which the latent heat is released and the rate at which the latent heat is released to the heat transfer fluid stabilize its temperature within a range which provides for an inlet condition to a water-to-air heat pump which is favorable to a high heat output from the heat pump system per unit energy input. Ideally, the inlet condition would be maintained at a constant temperature approaching the average annual ambient temperature; but in practice, a minimum temperature which is less than the minimum undisturbed soil temperature at the depth at which the improved earth coil is embedded determines the lower limit for the inlet temperature, the optimum constant temperature condition being approached when the coil is embedded approximately 12 ft. beneath the earth's surface.

A further object of the present invention is to provide an earth heat pump system having an improved earth coil which absorbs latent heat from the heat transfer fluid in order to stabilize its temperature within a range which provides for an inlet condition to a water-to-air heat pump which is favorable to a high cooling output from the heat pump system per unit energy input. In an alternate embodiment, a similar improved earth coil is utilized to provide nearly energy-free air conditioning by blowing the inside air across a heat exchanger which is included within the closed loop through which the heat transfer fluid is pumped. A single improved earth coil can be used to provide air conditioning by the latter means in the earlier portion in the summer when the undisturbed soil temperature surrounding the coil is sufficiently low (less than approximately 64° F.) and subsequently employed to remove heat from compressor of a heat pump system for cooling in the latter part of the summer. In many locales, only the blower is needed, when used in combination with the improved earth coil, to provide air conditioning for the entire cooling season.

The improved earth coil disclosed herein, in addition to stabilizing the temperature of the heat transfer fluid, maintains a more nearly time-averaged demand for heat transfer between the coil and the surrounding earth in close proximity thereto, the bulk of the energy transfer occurring within the enclosure containing the phase change material when the temperature of the heat transfer fluid approaches either of its limits. Thus the time interval during which energy must be transferred between the earth and the heat transfer fluid is effectively increased. As a consequence, the total length of the coil and size of the open area in which the coil is embedded can be substantially reduced. Moreover, the adverse effects from either freezing or overheating the surrounding soil can be greatly reduced.

The improved earth coil disclosed herein, when embedded in a shallow trench, can obviate the effects of the diurnal temperature swings which occur with greater amplitude near the earth's surface to a substantial degree, thereby providing a device for transferring energy between the earth and a heat transfer fluid which requires minimal capital for installation and maintenance.

A further object is to provide a means for juxtaposing encapsulated phase change materials in thermal contact with both a heat transfer fluid and with the subsoil of the earth's crust in which the temperature difference between the heat transfer fluid and the portion of the phase change material in closest proximity thereto is maximized in order to facilitate the absorption and liberation of the latent heat over numerous cycles without substantial supercooling and without stratification of the phase change material.

The improved earth coil described herein is assembled in sections which can be mass produced; differences in thermal conductivity of the soil from one locale to another, which necessitated the custom-design of heat pump systems utilizing a closed water loop in the prior art, are largely overcome as a result of the inertial effects of the phase change material jacketting each section of the improved earth coil.

Further objects and advantages of my invention will become apparent from an understanding of the following detailed description of the preferred embodiments of my invention.

DESCRIPTION OF THE PREFERRED EMBODIMENTS

Heat Pump Subsystem

Figure 1:
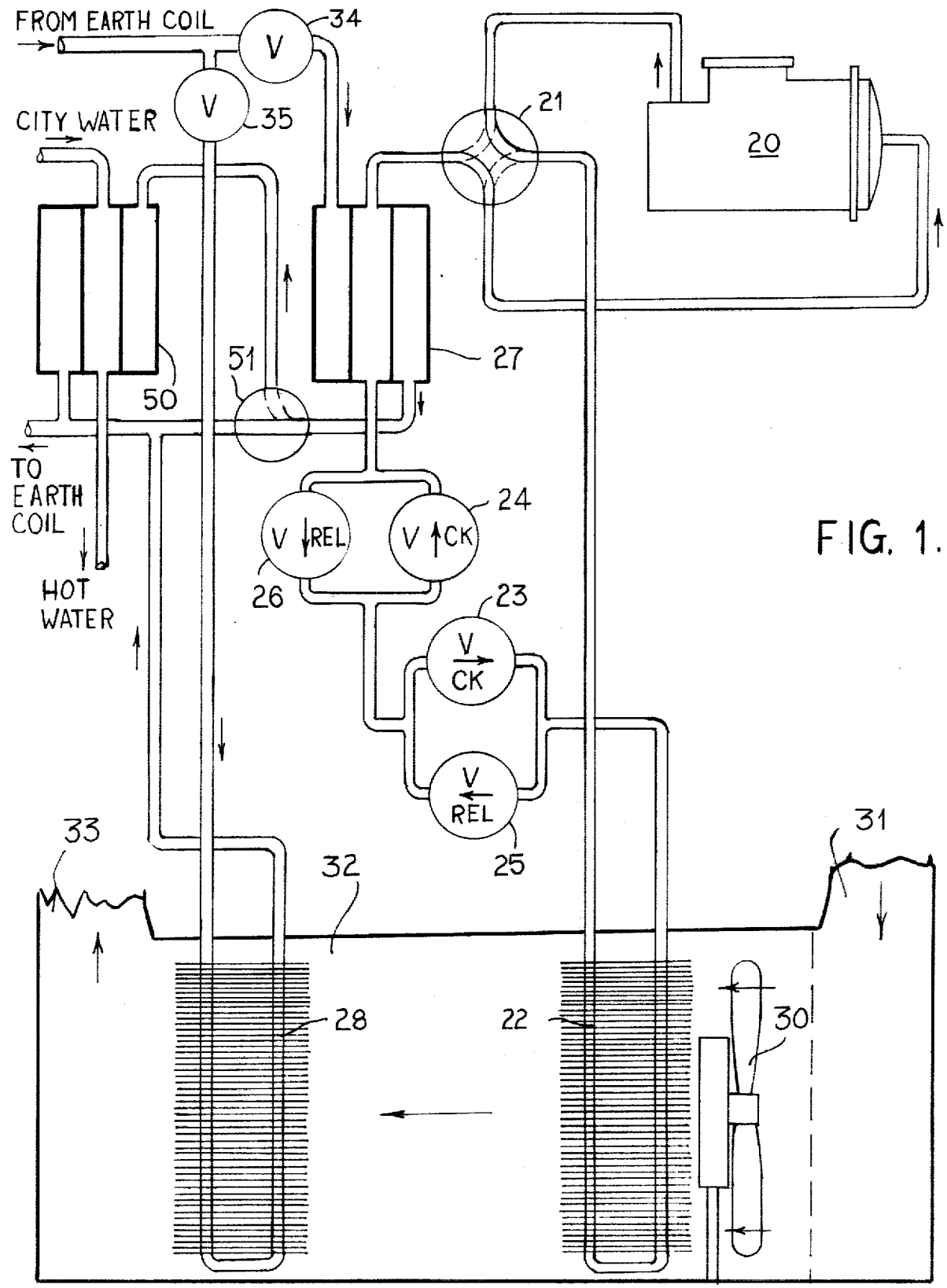
FIG. 1 is a diagrammatic plan view of the heat pump subsystem of a system for transferring heat from the earth to a conditioned space.

The heat transfer system of which the heat pump subsystem is disclosed in FIG. 1 is adapted at will to pump heat from a low temperature source such as the earth into a conditioned space, for example, a house to be heated during the winter or, by turning valve 21 to another position, to pump heat from the house into the earth during the summer. Except with respect to my earth-embedded, temperature-stabilized heat exchanger and the parts and devices appurtenant thereto, the heat transfer system here described is generally that which has been the subject of extended tests and is disclosed in the published literature, for example, Baker, "Design and Performance of a Residential Earth Heat Pump," Trans. A.S.H.V.E., 59, 371-394 (1952). The article cited described a system in which heat abstraction and storage is employed, consisting of an antifreeze-circulating system having an earth-embedded coil of copper tubing, a storage tank, and an antifreeze-circulating pump. The present invention, among other things, replaces the storage tank and the earth-embedded coil with an apparatus which both abstracts and stores heat.

Referring to FIG. 1, the refrigeration circuit of the heat pump subsystem includes a compressor 20, 4-way valve 21, air conditioning coil 22, check valves 23 and 24, pressure release valves 25 and 26, and fluid-to-refrigerant charge heat exchanger 27. If the conditioned space is to be heated, 4-way valve 21, which may be manually or thermostatically controlled, is placed in the position shown in solid lines in FIG. 1. Heat is pumped from the heat exchanger 27 to the air conditioning coil 22 by the following well-known process: A refrigerant charge issuing at high temperature and pressure from the compressor 20 passes to the air conditioning coil 22 where it gives up heat to the inside air. Downstream of the coil 22, the charge, bypassing the check valve 23, passes through pressure release valve 25 where its pressure and hence its temperature falls. Passing through check valve 24, the charge enters the heat exchanger 27. Heat taken from the heat exchanger 27 is ultimately abstracted from a heat source such as the earth. In the present invention, the heat is abstracted from the earth by circulating a heat transfer fluid such as water or the like through an unique temperature-stabilized heat exchanger 10 as explained subsequently herein (see FIG. 2).

If the conditioned space is to be cooled, the 4-way valve 21 is placed in the position shown in dotted lines in FIG. 1 and refrigerant charge issuing at high temperature and pressure from the compressor 20 passes to the heat exchanger 27 where it gives up heat to the heat transfer fluid; the heat is ultimately transferred to the earth. The charge then passes through the pressure release valve 26 where its pressure is reduced and its temperature further reduced, and it then passes through check valve 23 to the air conditioning coil 22 where it absorbs heat from the inside air. Thereafter, it passes through the 4-way valve 21 to the compressor 20 where the cycle is repeated. The conditioned space may also be cooled, when the temperature of the heat transfer fluid is sufficiently low, without the use of the refrigeration circuit of the heat pump subsystem. In the latter case, the heat transfer fluid is circulated through the secondary air conditioning coil 28 consisting of a water-to-air heat exchanger instead of through the heat exchanger 27.

A fan 30 draws air at room condition through the return duct 31, into a chamber 32 containing the air conditioning coils 22 and 28, and discharges it therethrough into an outlet duct 33 connected to an air distribution system (not shown).

Experience indicates that the maintenance of an approximately constant temperature at the inlet to the compressor 20 results in the efficient operation of a water-to-air heat pump. Heat pumps which are subject to extreme variations in heat source temperatures are only about one-half as efficient as those which are operated with approximately constant inlet temperatures near the average annual ambient temperature.

FLUID-CIRCULATING SUBSYSTEM

Figure 2:
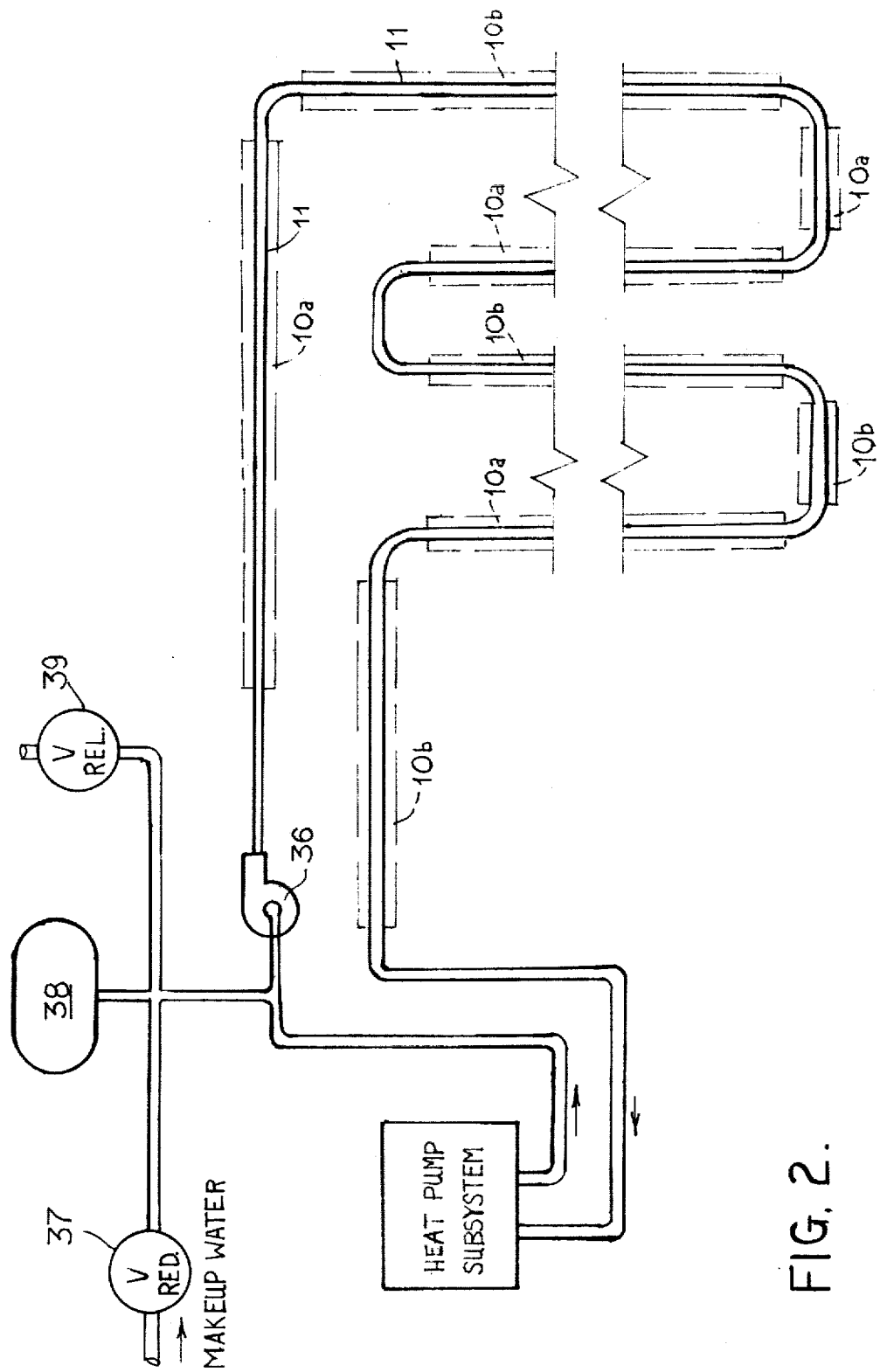
FIG. 2 is a diagrammatic plan view of the fluid-circulating subsystem of a system for transferring heat from the earth to a conditioned space in accordance with the present invention.

According to the present invention, I provide an earth-embedded, temperature-stabilized heat exchanger 10 which, together with the heat exchanger 27, a circulating pump 36, a pressure reducing valve 37, an expansion tank 38, and a safety valve 39, comprises a fluid-circulating subsystem for transferring heat to and from the earth (FIG. 2). In this subsystem, the primary heat transfer fluid which is water or the like is pumped through piping which connects each section 10a and 10b of the temperature-stabilized heat exchanger 10, the heat exchanger 27, and the circulating pump 36 to form a substantially closed loop. Alternately by closing valve 34 and opening valve 35, the heat exchanger 10, the secondary air conditioning coil 28, and the circulating pump 36 may be connected to form a substantially closed loop. It is understood, of course, that makeup water or the like is admitted to the subsystem through the pressure reducing valve 37 and that excess heat transfer fluid is released from the system through the safety valve 39.

Figure 5:
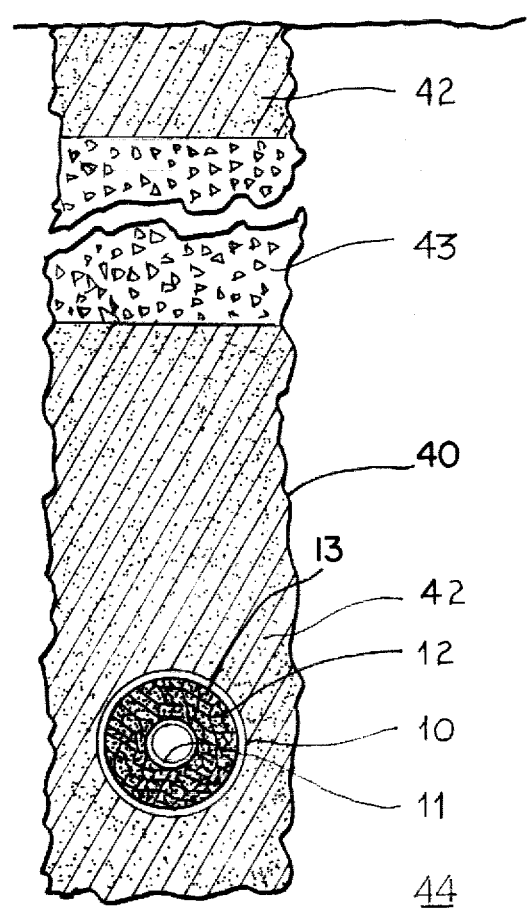
FIG. 5 is a reduced cross-sectional view of the temperature-stabilized heat exchanger shown in FIG. 3 embedded in a trench.

Each section 10a, 10b of the heat exchanger 10 is embedded in the earth below the frost-line; and preferably the invert of each section lies at a depth of at least 3 feet below the ground surface. An increased depth down to an optimum of approximately 12 ft. assures the availability of a higher soil temperature but is counteracted by a greater excavation cost. Beyond the optimum depth, however, the summer recovery becomes less than the winter loss. At shallower depths, the deviation of the extreme seasonal undisturbed soil temperatures from the annual ambient mean temperature becomes increasingly pronounced near the earth's surface as do the diurnal temperature swings. No matter at what depth the heat exchanger 10 is embedded, the heat path between it and the ground surface can be increased by placing gravel 43, a good, relatively cheap insulator, in the trenches 40 above the heat exchanger 10 as shown in FIG. 5.

Each winter configuration section 10a encapsulates a phase change material having a transition temperature which is approximately 10° F. below the mean winter undisturbed soil temperature at the depth at which the heat exchanger 10 is situated and a few degrees below the minimum undisturbed soil temperature at that depth. Each summer configuration section 10b, on the other hand, encapsulates a phase change material having a transition temperature which is approximately 10° F. above the mean summer undisturbed soil temperature at the depth of the exchanger 10 and a few degrees above the maximum undisturbed soil temperature at that depth. The heat transfer fluid is in thermal contact with a phase change material as the fluid traverses the entire length of each section 10a or 10b.

Each winter configuration section 10a of the heat exchanger 10 is preferably laid in the trench 40 (FIG. 5) on a gradual slope with the inlet thereto for the heat transfer fluid being elevated above the outlet, so that the initial contact of the heat transfer fluid is with that portion of the heat exchanger 10 in closest proximity to any fluid phase change material remaining in the enclosure 13 jacketting it, the crystals of the phase change materials described hereinbelow tending to accumulate near the lower outlet. Each summer configuration section 10b, on the other hand, is preferably laid on a slope in the opposite direction with the heat transfer fluid outlet being elevated above the outlet. By connecting every other section 10a and 10b in series as shown in FIG. 2, the slopes of each pair of the sections 10a and 10b can be laid parallel to each other. The centerline of each section 10a, 10b should be separated from the centerlines of neighboring sections 10a, 10b on either side thereof by a distance which is at least as long as the path from the heat exchanger 10 to the ground surface.

Preferably, the sections 10a and 10b are coupled together in the sequential order shown diagrammatically in FIG. 2 in order to increase the heat exchange capacity of the fluid-circulating subsystem. Alternately, the sections 10a and 10b can be isolated from each other by valving; or the setions 10b may be omitted altogether when summer cooling is not desired. As a further alternative, individual sections 10a and 10b may be isolated from the remainder of the system to allow each to rest between uses.

Over the course of a heating season, the temperature to which the heat transfer fluid can be heated in the fluid-circulating subsystem will decrease since there is a gradual decline in the undisturbed soil temperature until the minimum is reached within several weeks of the spring equinox. By way of example, the undisturbed soil temperature at a depth of 6 feet falls approximately 20° F. between September and March in the Kentucky locale which was studied in the article by Baker cited hereinabove.

The actual rate of decrease in the temperature to which the heat transfer fluid is warmed in the fluid-circulating subsystem is dependent not only upon the gradual decline in the soil temperature but also upon the heat abstraction rate demanded by the heat pump subsystem; the total lengths of the sections 10a and 10b of the heat exchanger 10; the heat transfer rates across the several interfaces interposed between the heat transfer fluid within the heat exchanger 10 and the far, undisturbed earth; and the temperature and rate at which the phase change material undergoes transition.

Generally, the same rate of heat abstraction can be obtained using the fluid-circulating subsystem illustrated in FIG. 2 in which the total combined length of the sections 10a is substantially less than one-half of the total length of an earth-embedded coil such as the ⅜ inch O.D. copper tubing described by Baker in the article cited hereinabove. Moreover, the minimum temperature to which the heat transfer fluid falls during the latter period of the heating season when the minimum undisturbed soil temperature occurs will remain within several degrees of the transition of the phase change material encapsulated in the winter configuration sections 10a. Accordingly, for warmer climates, the temperature of the heat transfer fluid can be maintained above the freezing point of water, thereby enabling the heat pump system to be operated in a region of high efficiency.

Over the course of a cooling season, the temperature to which the heat transfer fluid can be cooled in the fluid-circulating subsystem will increase since there is a gradual rise in the undisturbed soil temperature until the maximum is reached within several weeks of the fall equinox. The deviation from the annual mean ambient temperature is approximately 16° F., by way of example, for the same Kentucky locale cited hereinabove. During the early months of summer when the undisturbed soil temperature is less than approximately 64° F., the fluid-circulating subsystem with the use of the secondary air conditioning coil 28 can be employed to obtain nearly energy-free air conditioning. Only, the motor of the fan 30, which is, by way of example, about ⅓rd horsepower, is actuated among the components of the heat pump subsystem illustrated in FIG. 1. If the heat pump subsystem is also adapted to provide a heat source for domestic hot water for those locales in which the undisturbed soil temperature does rise above 64° F., the amount of heat which must be absorbed by the earth can be substantially reduced. In any event, the maximum temperature to which the heat transfer fluid rises during the latter period of the cooling season when the maximum undisturbed soil temperature occurs will remain within several degrees of the transtion temperature of the phase change material encapsulated in the summer configuration sections 10b having a total combined length which is comparable to the total combined length of the winter configuration sections 10b recited hereinabove.

Temperature-Stabilized Heat Exchanger

Figure 3:
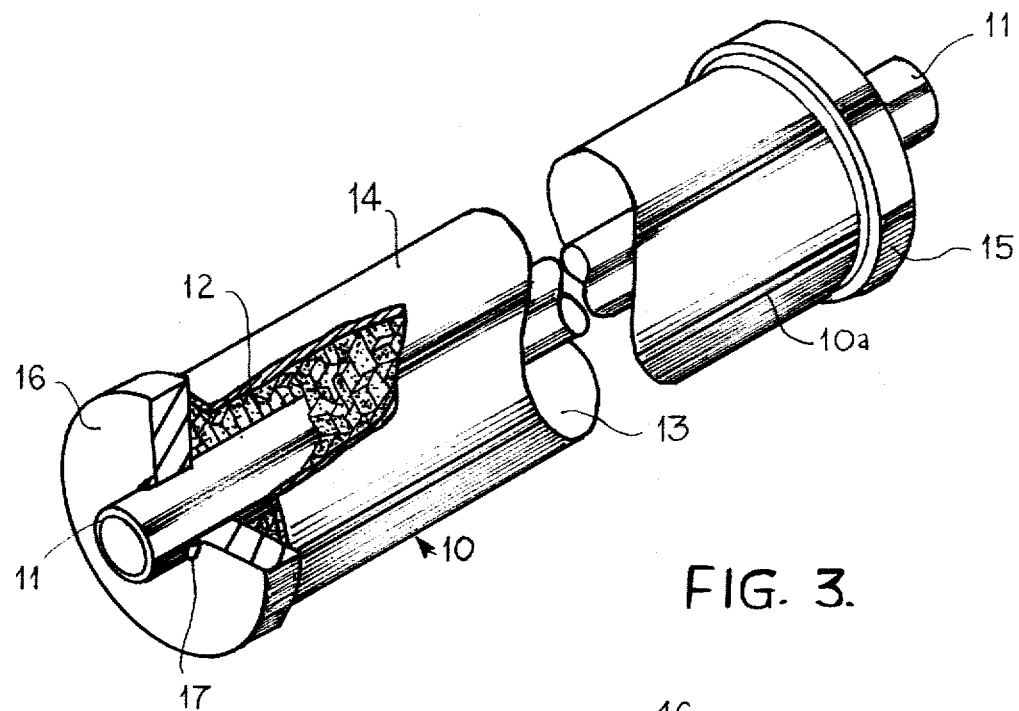
FIG. 3 is a perspective view of a section of a temperature-stabilized heat exchanger constructed in accordance with the present invention.

Referring to FIG. 3, there is seen therein a section of the temperature-stabilized heat exchanger 10 having a pipe 11 through which the primary heat transfer fluid is circulated. A phase change material 12 described hereinbelow is contained within the elongated enclosure 13 formed by the outer wall of the pipe 11, the cylindrical jacket 14, and a pair of end plates 15 and 16. All of the components of this enclosure are formed of a plastic material such as high density polyethylene or the like. Care must be taken to hermetically seal the phase change material 12 within the enclosure 13 in order to maintain the water vapor pressure of the phase change material 12 within a narrow range. It is widely accepted that high density polyethylene is the preferred material to form such an enclosure since it can be sealed hermetically and has a low water permeability, limiting the loss of water vapor through the walls of such enclosures to less than 0.25% per year. Further, high density polyethylene does not react chemically with phase change materials as do some metals, has tensile strength yield in the region of 4000 psi, and is very tough which allows it to accomodate volume changes which may occur during freezing within the pipe 11 or within the enclosure 13 containing the phase change material.

A method of fabricating the preferred embodiment of the present invention seen in FIG. 3 which can be employed to mass produce standard sections of the heat exchanger 10 is as follows: a circular opening of slightly smaller diameter than the inner diameter of the pipe 11 is drilled in the end plate 15, a piece of solid plastic stock. A similar circular opening, but of approximately the same diameter as the outer diameter of the pipe 11, is made in the end plate 16 so that this plate fits snugly on the pipe 11 but can be slide along it. The centers of both circular openings are located in approximately the same position in the faces of each of the end plates 15 and 16. By the use of butt fusion welding procedures for high density polyethylene pipe which are well-known to those skilled in the art, the pipe 11 is butt-welded to the end plate 15 so that the circular opening therein is aligned with the center of the end of the pipe 11. Similarly, the cylindrical jacket 14 is butt-welded to the end plate 15. When the fused joints have hardened and cooled, the partially-assembled unit is supported in a vertical position and filled with a suitable phase change material as described hereinbelow. Sufficient space below the upper rim of the cylindrical jacket 14 is left empty, allowing for the expansion of the phase change material during freezing. The pre-drilled end plate 16 is then slid onto and down the protruding end of the pipe 11 and butt-welded to the upper edge of the cylindrical jacket 14. Finally, a hot gas filler weld 17 is made at the interface between the pipe 11 and the outer face of the plate 16, completing the hermetical sealing of the phase change 12 material within the enclosure 13.

As illustrated in FIG. 3, the centerline of the pipe 11 generally coincides with the centerline of the cylindrical jacket 14. In an alternate preferred embodiment, the centerline of the pipe 11 is offset from the centerline of the cylindrical jacket 14 but generally parallel thereto. Such an arrangement is provided so that the pipe 11 can be disposed above or below the bulk of the phase change material contained within the enclosure 13 depending upon whether the phase change material has a transition temperature suitable for a winter configuration section 10a or a summer configuration section 10b, respectively. Positioning the pipe 11 so that it contiguous with the crown of the cylindrical jacket 14 juxtaposes the heat transfer fluid in closest proximity to the warmer, less dense melt of the encapsulated phase change material which may be present in the enclosure 13. Placing the pipe 11 so that it is beneath the bulk of the phase change material, on the other hand, juxtaposes the heat transfer fluid and any crystals which may be present.

Figure 4:
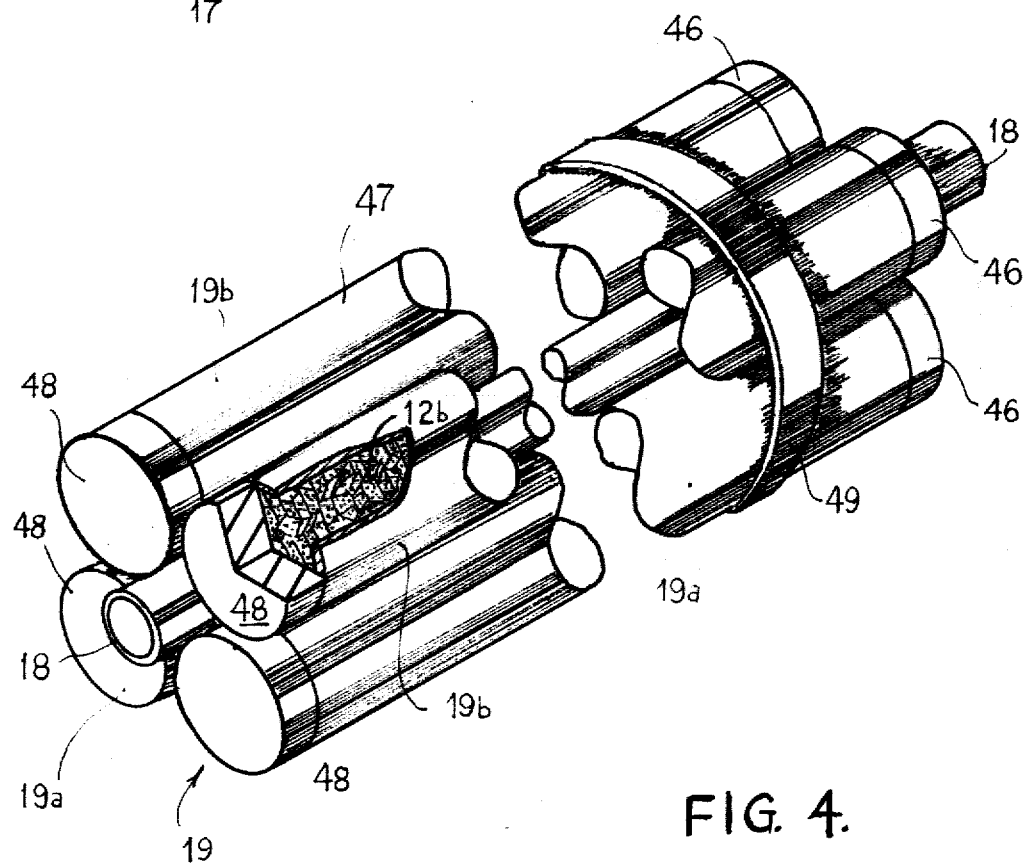
FIG. 4 is a perspective view of an alternate embodiment of a temperature-stabilized heat exchanger constructed in accordance with the present invention.

In a further alternative embodiment of the present invention seen in FIG. 4, a pipe 18 is formed of any suitable material such as high density polyethylene or polypropylene, polyvinyl chloride, ABS, or a metal such as copper. The four hermetically sealed enclosures 19a and 19b are formed of high density polyethylene or the like. One of the end plates 46 on each enclosure is butt-welded to the jacket 47. The jacket 47 is then supported in a vertical position and filled with a suitable phase change material. Two enclosures 19a are filled with a phase change material 12a having a transition temperature which is a few degrees below the maximum undisturbed soil temperature at the site at which the heat exchanger 19 is to be embedded. The remaining two enclosures 19b are filled with a phase change material 12b having a transition temperature which is a few degrees above the minimum undisturbed soil temperature at the same site. Upon filling the enclosures 19a and 19b, adequate space is left below the upper rim of each jacket 47 to allow for the expansion of the phase change material contained therein during freezing. An end plate 48 is then butt-welded to the upper edge of each cylindrical jacket 47 completing the hermetical seal. Stainless steel straps 49 secure the four enclosures 19a and 19b firmly about the periphery of the pipe 11. The straps 49 may be fastened by any appropriate means such as stainless steel nuts and bolts. The voids formed between the points of contact of the enclosures 19a and 19b and the pipe 11 should be filled with a material which provides good thermal contact between the walls of the pipe and of the enclosures such as the polyester body filler 6372 Cuz manufactured by The Martin-Seymour Company, Chicago, Illinois, small-aggregate concrete, or the like.

The sections of the earth-embedded, temperature-stabilized heat exchangers 10 are plumbed to each other and to the remainder of the fluid-circulating subsystem either by butt-welding the ends of the pipe 11 to pipe of the same diameter and chemical composition or by mechanical coupling means. The sections of the alternate embodiments are plumbed in the same manner. The slope of each trench 40 (FIG. 5) is adjusted by placing a firmly packet bed of moist sand in the bottom of each trench prior to lowering the the heat exchanger therein. Preferably, slings are placed around the heat exchanger sections at appropriate intervals to aid in lowering the entire assembled heat exchanger into the trench 40 at one time.

Compositions of Phase Change Materials

Several compositions of phase change materials are widely known which are suitable for use either in the winter configuration sections 10a or in the summer configuration sections 10b. In particular, salt-hydrates are included in these compositions. Preferred salt-hydrates, with a latent heat in the neighborhood of 100 BTU per pound, include mixtures of anhydrous sodium sulfate, sodium chloride, and water with ammonium chloride present in the range 0% to 12% by weight. These mixtures are described in M. Telkes' U.S. Pat. No. 2,989,856. In addition, phase change materials which are mixtures of various percentages of sodium sulfate, magnesium sulfate, sodium chloride, and water and which have transition temperatures between 75° F. and 60° F. are also described in the cited Telkes' patent. In all, salt hydrates based on sodium sulfate decahydrate which itself melts at 90° F. are known which melt in the range of 40° F. to 90° F. according to M. Telkes, "Latent Heat Storage Techniques," Symposium on Energy from the Sun, Institute of Gas Technology, Chicago, Ill., April 3-7, 1978. Dependent upon the locale and the depth in the soil at which the heat exchanger 10 is to be used, one of these salt-hydrate compositions has a transition temperature which is approximately 10° F. above the mean seasonal ground temperature in the summer and can be used as the phase change material in the summer configuration 10b.

The salt-hydrate composition which has a transition temperature of 40° F. is a mixture of sodium sulfate, sodium chloride, potassium chloride, and water and is described in the Telkes' patent cited hereinabove. Water itself is a phase change material with a normal freezing point of 32° F. which undergoes increasing degrees of freezing point depression with the addition of various salts. For example, S. Fairweather in U.S. Pat. No. 2,781,643 discloses a solution of sodium sulphate 3.8% by weight which has a transition temperature of 29.5° F. Solutions of potassium chloride further depress the freezing point of water—down to about 14° F. as described in standard works, for example, "Physical Chemistry," by Paul, D. C. Heath and Company, 1962. One of the combinations of at least one salt-hydrate and water has a transition temperature which is approximately 10° F. below the mean seasonal ground temperature in winter for a particular locale and can be used for the phase change material in the winter configuration section 10a.

A suitable heterogeneous nucleating agent such as borax (sodium tetraborate decahydrate) in quantities of 2 to 5% as described in M. Telkes' U.S. Pat. No. 2,677,664 should be added to the phase change materials described supra to avoid supercooling below the transition temperature in winter or, alternately, superheating above the transition temperature in summer.

A homogenizer or thickening agent such as the attapulgus-type clay described in M. Telkes' U.S. Pat. No. 3,986,969 should be combined with the phase change materials described hereinabove to reduce losses in efficiency of heat or coolness storage due to the separation and settling of higher density anhydrous components of the phase change material. A suitable method of mixing the thickening agent, the nucleating agent, and the salt-hydrate mixture is also described in U.S. Pat. No. 3,986,969. Care must be taken to agitate the mixture while filling the enclosure of each section of the heat exchanger since the mixture gels rather rapidly after it is no longer agitated.

Operation in the Heating Mode

During the initial phase of the heating season when the heat abstraction rate demanded by the heat pump subsystem is low, typically of the order of 2 to 4 BTU per hour per foot averaged over the entire length of the heat exchanger 10, the temperature of the heat transfer fluid remains above the transition temperature of the phase change material encapsulated in the winter configuration sections 10a. Sensible heat is transferred to the fluid through the walls of the heat exchanger 10 from the phase change materials and the earth. By way of example, the sensible heat capacity per unit length of the heat exchanger 10 in which the pipe 11 and the cylindrical jacket 12 have nominal pipe sizes of 1 and 4 inches, respectively, amounts to between 3 and 9 BTU per °F. per foot. For a total length of 460 feet for both the winter and summer configuration sections 10a and 10b in the heat exchanger 10, the sensible heat capacity amounts to between 1380 and 4140 BTU per °F. which may be compared with a 8300 BTU per °F. sensible heat capacity for the 1000 gal. water storage tank used by Baker in the article cited hereinabove. With a lower total sensible heat capacity, a fluid-circulating subsystem supplies heat to a particular heat pump subsystem at a lower temperature, especially immediately after the compressor has been running for a while. However, due to the fact that the compressor 20 runs only intermittently when the heat abstraction rate is low, the temperature of the heat transfer fluid recovers rapidly once the compressor is shut down; moreover, the recovery rate is much faster with a heat exchanger 10 having a large surface-to-volume ratio than in a case in which thermal storage capacity is provided by a water storage tank and heat transfer fluid is circulated through a tube of small diameter.

With increased demands for heat as the winter progresses, the average daily temperature of the heat transfer fluid begins to fall below the transition temperature of the phase change material encapsulated in the winter configuration section 10a. A portion of this material then undergoes a phase change from the liquid to the crystalline state. Approximately, 100 BTUs of heat are released per pound of crystals formed and transmitted to the heat transfer fluid at a rate dependent upon the overall heat transfer coefficient between the phase change material and the heat transfer fluid. The maximum value for this coefficient, including film coefficients, is approximately 15 BTU per sq. ft. per hr. per °F. In the example of the heat exchanger 10 in which the pipe 11 and the cylindrical jacket 12 have nominal pipe sizes of 1 and 4 inches, respectively, the pipe 11 in the winter configuration section 10a is surrounded by phase change material which, during crystallization, can release a total of approximately 940 BTU per ft. to pipe 11. In this example in which the outer surface area of pipe 11 is about 0.26 sq. ft. per linear foot, the maximum rate of heat transfer is about 39 BTU per hour per linear foot for a 10° F. temperature difference between the phase change material and the heat transfer fluid. Accordingly, the phase change material encapsulated in the winter configuration section 10a can, for the 10° F. temperature difference stated in this example, be transformed from its liquid to its crystalline state in no less than approximately 24 hours. The percentage of the phase change material which is so transformed depends upon the heat abstraction rate imposed upon the fluid-circulating subsystem and upon the rate of heat transfer to the phase change material 12 from the surrounding earth. Heat continues to drain into the phase change material from the surrounding soil, provided the earth surrounding the outer walls of the heat exchanger 10 is at a higher temperature than the phase change material.

The presence of a phase change material which is releasing latent heat at or slightly below its transition temperature and which is in thermal contact with the heat transfer fluid substantially slows the instantaneous rate at which heat is demanded from the earth, the latent heat capacity of the phase change material being approximately 100 times greater than its sensible heat capacity. Because the earth then has a longer time interval in which to recover from a given amount of heat removal, the temperature of the earth in the immediate vicinity of the heat exchanger 10 remains, for longer periods of time, close to the undisturbed soil temperature rather than falling rapidly to freezing or below upon startup of the heat pump subsystem. Such plummeting temperatures would occur in the case of a fluid-circulating subsystem having a sufficiently short earth coil of copper tubing without thermal storage capacity. Consequently, substantially more heat can be abstracted from the earth surrounding the heat exchanger 10 before the temperature of the earth in close proximity to it falls below the freezing point of water. With the heat exchanger 10, the temperature of the heat transfer fluid can be maintained within a region, preferably at least a few degrees above the freezing point of water, in which the ratio of the heat output of the heat transfer system to its energy input is high. The minimum temperature which can be maintained will, of course, decrease with a reduction in the total length of the winter configuration sections 10a.

The heat abstraction capacity of the heat exchanger 10 can be further enhanced by the use of well-known techniques for increasing the heat content surrounding an earth coil without encapsulated phase change material. The heat exchanger 10 should be embedded in an open area, preferably one which receives full sunlight in winter. The moisture content of the earth surrounding the heat exchanger 10 should be kept high. In general, the trenches should be situated in a low-lying area and be filled with sand 42 to allow a more rapid migration of heat-laden underground water towards the chilled walls of the heat exchanger 10. Tubes with holes therein to allow a gradual irrigation of the trenches may also be placed above the sections 10a. The performance of the sections 10a can be further improved by allowing warm waste water, such as domestic shower water, to irrigate the trenches and aid in the regeneration of the phase change material to its original liquid state.

Some additional heat can also be obtained from the freezing of ground moisture about the outer walls of the heat exchanger 10 if the temperature of the heat transfer fluid is allowed to fall below the freezing point of water. Again irrigation of the trenches is useful not only for regeneration but also to prevent separation between the walls of the heat exchanger 10 and the surrounding soil which would otherwise greatly reduce the heat transfer rate therebetween. In the past, the freezing of this ground moisture was largely avoided, being considered at most a favorable effect of very limited duration.

Operation in the Cooling Mode

During the initial phase of the cooling season when the heat dissipation demand is low, the temperature of the heat transfer fluid remains below the transition temperature of the phase change material encapsulated in the summer configuration sections 10b of the heat exchanger 10. Sensible heat is transferred away from the fluid through the walls of the heat exchanger 10 to the phase change material and ultimately to the earth. The sensible heat capacity per unit length of the heat exchanger 10 is approximately the same as during the initial phase of the heating season since the phase change material in the winter configuration section 10a is in a liquid state and that in the summer configuration section 10b remains frozen.

In locales in which the undisturbed soil temperature at the depth at which the heat exchanger 10 is embedded remains below approximately 64° F. throughout the summer months (such as occurs at a depth of 6 ft. in the Kentucky locale described in the article by Baker cited hereinabove), heat can be removed from a conditioned space utilizing the fan 30 and the secondary air conditioning coil 28 for the major portion of the cooling season (See FIGS. 1 and 2). By methods well-known in the art, controls (not shown) can be utilized to energize the motor of the fan 30 at the same time the motor of the compressor 20 is de-energized. When valve 34 is closed and valve 35 open, heat transfer fluid is pumped through the secondary air conditioning coil 28. The fan 30 blows inside air across the coil 28 cooling the air and warming the heat transfer fluid. As long as the required heat dissipation rate is low, the fan 30 runs only intermittently; simultaneously, heat from the heat transfer fluid drains continuously into the phase change material and from thence to the surrounding soil.

With increased demands for cooling as the summer progresses, the compressor 20 in the refrigeration circuit of the heat pump subsystem may need to be energized to cool the inside air adequately. In any event, the average daily temperature of the heat transfer fluid begins to creep upward until it is a few degrees above the transition temperature of the phase change material encapsulated in the summer configuration sections 10b. A portion of this material then undergoes a phase change from the crystalline to the liquid state. The rate at which the phase change material undergoes this transition is limited by the overall heat transfer coefficient between the phase change material and the heat transfer fluid. A comparable time period is required to melt the phase change material in the sections 10b as is required to crystallize the phase change material in the winter configuration sections 10a, assuming that the latent heat of transition is approximately the same for both phase change materials and that the total lengths of both sections 10a and 10b are of approximately the same length. Heat continues to drain from the heat exchanger 10 to the surrounding soil, provided the earth surrounding its outer walls is at a lower temperature than the phase change material.

The presence of a phase change material which is absorbing latent heat at or slightly above its transition temperature and which is in thermal contact with the heat transfer fluid substantially slows the instantaneous rate at which heat must be absorbed by the earth. Because the earth then has a longer time interval in which to dissipate a given amount of heat, the temperature of the earth in the immediate vicinity of the heat exchanger 10 remains, for longer periods of time, close to the undisturbed soil temperature rather than climbing rapidly during hot days. Consequently, substantially more heat can be dissipated to the earth before the temperature of the soil in close proximity to the heat exchanger 10 causes the heat transfer fluid to become so hot, being in excess of approximately 125° F., as to force the shutdown of the compressor 20 in the heat pump subsystem. With the heat exchanger 10, the temperature of the heat transfer fluid can be maintained within a region in which the ratio of the cooling output to the energy input for the heat transfer system is high. During the period when only the fan 30 is required, this ratio is very high being on the order of 11, a coefficient-of-performance indicative of nearly energy-free air conditioning. The maximum temperature to which the heat transfer fluid is warmed will, of course, increase with a reduction in the total length of the summer configuration sections 10b.

The heat dissipation capacity of the heat exchanger 10 can be further enhanced by increasing the moisture content surrounding it in a manner similar to that described hereinabove for operation during the winter mode. However, no warm waste water, such as domestic shower water, should be used to irrigate the trenches. For cooling purposes, the heat exchanger 10 is preferably embedded in a low-lying area shaded by large, deciduous trees.

For additional summer cooling capacity, the heat transfer fluid can be passed through a 3-way valve 51 and into a water-to-fluid heat exchanger 50 to heat domestic hot water before returning it to the temperature-stabilized heat exchanger (see FIGS. 1 and 2).

The apparatus according to my invention may take various shapes and forms. I do not desire to be limited to an apparatus of any particular shape or form, or put to any particular use, but to have the advantage of my invention as and to the extent set forth in the following claims.

What is claimed is:

1. In a system for heating and air conditioning a structure in which thermal energy is exchanged between the structure and the earth, the system having a first closed circuit in thermal contact with a second closed circuit in a heat exchange zone; the heat exchange zone embodying a fluid-to-refrigerant charge heat exchanger; the first closed circuit having a compressor for circulating a refrigerant charge through the heat exchanger and through an air conditioning coil; a means including said coil and a fan for distributing heated or cooled air to a conditioned space within the structure; the first closed circuit further including a 4-way valve in series with the compressor, the heat exchanger and the coil whereby in one mode of the valve the heat exchanger functions as an evaporator and the coil functions as a condenser; and in the other mode the functions are reversed; the second closed circuit including a passageway of the heat exchanger, an underground pipe having a heat conductive portion, and a pump for circulating a heat transfer fluid through the passageway and the underground pipe; wherein the improvement comprises:

a temperature-stabilized heat exchanger which is embedded in the earth, the heat exchanger having a hermetically-sealed enclosure which jackets a section of the heat conductive portion; the thickness of the walls of the enclosure being at least as great as that of the wall of said section; a composition which upon crystallization releases latent heat in the amount of approximately 100 BTUs per pound and which is contained within the enclosure, the transition temperature of the composition being approximately 10° F. below the average winter temperature of the undisturbed soil at the depth at which the temperature stabilized heat exchanger is embedded, so that a large amount of thermal energy can be stored in close proximity to said heat transfer fluid, thereby protecting the environment in the vicinity of said section against the effects of extremely low temperatures when heating of the structure is required; the enclosure having a large surface-to-volume ratio and having its outer walls in thermal contact with the soil, so that the composition can be restored to its liquid state by thermal energy transfer from the earth to the composition when the heating requirements are low.

2. A temperature-stabilized heat exchanger according to claim 1 in which the composition which releases latent heat has a transition temperature which is above the freezing point of water, thereby protecting the environment in the vicinity of said section against freezing.

3. A temperature-stabilized heat exchanger according to claim 1 which further comprises a second hermetically-sealed enclosure and a second composition which is contained therein, the second composition, upon melting, absorbing latent heat in the amount of approximately 100 BTUs per pound; the second enclosure jacketting a section of the heat conductive portion and being embedded in the earth; the transition temperature of the second composition being approximately 10° F. above the average summer temperature of the undisturbed soil at the depth at which the second enclosure is embedded, so that large amounts of energy can be dissipated, when cooling of the structure is required, in close proximity to the heat transfer fluid, thereby protecting the environment in the vicinity of the temperature-stabilized heat exchanger against the effects of high temperatures; the second enclosure having a large surface-to-volume ratio and having its outer walls in thermal contact with the soil, so that the second composition can be restored to its crystalline state by thermal energy transfer from the composition to the earth when the cooling requirements are low.

4. The temperature-stabilized heat exchanger according to claim 3 wherein the heat transfer fluid is circulated through the coil of a fan-coil unit to provide direct cooling, the heat transfer fluid bypassing the fluid-to-refrigerant charge heat exchanger.

5. A temperature-stabilized heat exchanger according to claim 1 wherein the outer wall of said section of the heat conductive portion of the underground pipe is wetted by the composition which is contained within the enclosure jacketting said section when the composition is in its liquid state, the enclosure being formed of high density polyethylene.

6. A temperature-stabilized heat exchanger according to claim 1 wherein the composition further comprises a salt hydrate and the walls of the enclosure in which the composition is contained have an extremely low permeability, the rate at which water vapor is lost through the walls of the enclosure being less than 0.25% per year.

7. A temperature-stabilized heat exchanger according to claim 6 wherein the enclosure is formed of high density polyethylene.

* * * * *